US012756492B2

(12) United States Patent
Su et al.

(10) Patent No.: US 12,756,492 B2
(45) Date of Patent: Oct. 6, 2026

(54) OPTICAL FIBER INPUT/OUTPUT TRAY WITH WAVELENGTH DIVISION MULTIPLEXING SUPPORT FOR A CO-PACKAGED OPTICAL SWITCH

(71) Applicant: Quanta Computer Inc., Taoyuan City (TW)

(72) Inventors: Chin-Lung Su, Taoyuan City (TW); Chang-Sheng Lin, Taoyuan City (TW); Hsiao-Hsien Weng, Taoyuan City (TW); Zong-Syun He, Taoyuan City (TW)

(73) Assignee: Quanta Computer Inc., Taoyuan City (TW)

( * ) Notice: Subject to any disclaimer, the term of this patent is extended or adjusted under 35 U.S.C. 154(b) by 357 days.

(21) Appl. No.: 18/442,768

(22) Filed: Feb. 15, 2024

(65) Prior Publication Data

US 2025/0070905 A1 Feb. 27, 2025

Related U.S. Application Data

(60) Provisional application No. 63/578,108, filed on Aug. 22, 2023.

(51) Int. Cl.
*H04J 14/02* (2006.01)
*H04Q 11/00* (2006.01)

(52) U.S. Cl.
CPC ...... *H04J 14/0212* (2013.01); *H04Q 11/0005* (2013.01); *H04Q 2011/0016* (2013.01)

(58) Field of Classification Search
CPC ........................................................ G02B 6/42
See application file for complete search history.

(56) References Cited

U.S. PATENT DOCUMENTS

| | | | | |
|---|---|---|---|---|
| 10,826,613 | B1 * | 11/2020 | Liang | B60G 3/00 |
| 11,719,898 | B2 * | 8/2023 | Nagarajan | G02B 6/43 398/164 |
| 2022/0029380 | A1 * | 1/2022 | Kovsh | H01S 5/02251 |
| 2022/0283360 | A1 * | 9/2022 | Nagarajan | G02B 6/43 |
| 2024/0322909 | A1 * | 9/2024 | Bovington | H04B 10/503 |

* cited by examiner

*Primary Examiner* — Jerry Rahll
(74) *Attorney, Agent, or Firm* — Nixon Peabody LLP

(57) ABSTRACT

An optical input/output tray for management of optical fibers installed in a switch assembly is disclosed. The switch assembly has a co-packaged optics module with an optical data signal input and a laser input, and a front panel. The optical input/output tray includes a housing insertable in the switch assembly. A first set of adapters are connectable to the co-packaged optics module. A second set of adapters is connectable to the front panel. WDM components convert a plurality of multi-wavelength signals from the first set of adapters to a single multiplexed signal coupled to the second set of adapters. The WDM components converts a single multiplexed signal from the second set of adapters to multi-wavelength signals coupled to the first set of adapters. A fiber management structure in the housing communicates optical signals between the first set of adapters, the WDM components, and the second set of adapters.

20 Claims, 14 Drawing Sheets

OPTICAL FIBER INPUT/OUTPUT TRAY WITH WAVELENGTH DIVISION MULTIPLEXING SUPPORT FOR A CO-PACKAGED OPTICAL SWITCH

CROSS-REFERENCE TO RELATED APPLICATIONS

This application claims priority from and benefit of U.S. Provisional Patent Application Ser. No. 63/578,108, filed on Aug. 22, 2023, which is hereby incorporated by reference herein in its entirety.

TECHNICAL FIELD

The present invention relates generally to an input/output tray for managing optical fiber, and more specifically, to an input/output tray for supporting optical components that includes wavelength division multiplexing (WDM) capabilities for a switch.

BACKGROUND

Co-packaged optics (CPO) switch systems are being employed for high speed data transmissions in application such as switches for data or telephonic communications. For example, a switch may route optical signals from fiber optic cables that are transmitted and received by networked devices. Optical signals are faster and have greater bandwidth than electrical signals transmitted by traditional wire cables. A switch is based on a co-packaged optics assembly that includes a high-density organic substrate, a switch integrated circuit, and optical modules. Each of the optical modules has three fiber arrays. One of the fiber arrays transmits optical data signals, and a second one receives optical data signals. The third fiber array is optically connected to an external laser source (ESL) module. The external laser source module emits a continuous wave laser output signal and functions as a light source for the optics module. The continuous wave laser output signal is provided to the optical module via an optical cable that may have one end connected to the external laser source module and the other end connected to the optical module. The continuous wave laser signal is modulated by the optical module to carry optical signals.

Currently, co-packaged optics (CPO) modules are used to increase the interconnecting bandwidth density and energy efficiency of optics by dramatically shortening the electrical link length through advanced packaging and co-optimization of electronics and photonics. A multi-wavelength CPO switch application, such as an 8×400G based-FR4 optical module, requires energy efficiency offered by a co-packaged optics module.

DR4/XDR4 (FR)/XXDR4 (LR) respectively refer to transmitting distances of 500 m/2 km/10 km via a single mode fiber. 4× means 8× optical channel pairs (4×Tx and 4×Rx), 400G QSFP-DD transceivers transmitting 400G over 4 optical lanes and each lane for 100G, and normally using a MPO-12 single mode receptacle. "FR" refers to 2 km reach using single-mode fiber, and "4" implies there are 4 optical channels. Unlike the DR4 and SR8, all of the 4 optical channels from an FR4 are multiplexed onto one fiber, resulting in a total of 2 fibers from the module (1 Tx and 1 Rx). Each optical channel operates at 100 Gb/s.

Wavelength division multiplexing (WDM) is simultaneously transmitting multi-wavelength signals through a single fiber. The data rate and data capacity for a fiber are increased many times by use of WDM. By using a multiplexer (MUX), signals at different wavelengths are combined into a single mode fiber at an emitter terminal, and, is individually separated dependently at receiver terminal by a demultiplexer (DeMUX). Based on the specification of the MUX/DeMUX, the transmitting and divided wavelength range can be decided. According to the International Telecommunication Union (ITU) standard, WDM is divided into Dense Wavelength Division Multiplexer (DWDM) and Coarse Wavelength Division Multiplexer (CWDM) by the wavelength segment range. The wavelength segment range of DWDM is less than 0.8 nm while the segment range of CWDM is 20 nm.

The normal MUX and DeMUX components for supporting WDM capability include an arrayed waveguide grating (AWG) and a thin film filter (TFF). An AWG uses light diffraction and reflective grating diffraction to provide wavelength division. Through the AWG, an input multiple wavelength light is diffracted and projected into a waveguide array. Diffracted light is then transmitted through the waveguide array. The light is diffracted and focused by a grating-surface concave into a waveguide of specific position by specific wavelength. In this manner the output from the AWG can reach demultiplexers to retrieve individual channels of different wavelengths at the receiver of an optical communication network. The AWG can also be the multiplexer. A TFF is accomplished through layers of coating on a Z-block to reach transparence and reflection of the specific wavelength, and then to reach wavelength division. Due to maintaining the light beam size and reducing light scattering after the times of reflection, the collimators are deployed in each input/output window.

Known optics module designs include a single-wavelength DR4 application or a multi-wavelength FR4 application, for 500 m and 2 km distance transmission, respectively. In a FR4 module, the elements in a DR4 module are used, but the FR4 application also requires two sets of wavelength division multiplexing (WDM) elements and other necessary optical elements. The limited space for such components is a challenge in this module design. Insertion loss based on coupling to the WDM elements and laser dispersion after long distance transmission are additional issues. Therefore, integration for an FR4 module presents more space and component design challenges than a DR4 application overall.

FIG. 1A shows a known 4-channel coarse-wavelength-division-multiplexing (CWDM4) optical module 10 that is coupled to a single optical fiber 12. The module 10 includes two sets of WDM components, a wavelength multiplexing (MUX) circuit 14 and wavelength de-multiplexing (DEMUX) circuit 16. A set of four transmission channels 18 are coupled to a transmitter 20 that converts the signals to laser drivers 22 that are each coupled to lasers 24 that have different wavelengths. The output of the lasers 24 are fed into the MUX 14 and converted to a signal for the fiber 12. The WDM MUX 14 can gather optical light signals in four wavelengths and multiplex the signals into a single fiber. In contrast, the de-multiplexing circuit 16 separates four wavelengths of light signals propagating from the single fiber 12 to four fibers individually without any interference between transmitter protocol and data rate. The separated signals are fed into photo diodes (PD) 26. The output of the photodiodes 26 are fed into optical transimpedance amplifiers (TIA) 28 to a receiver 30 that outputs the signals into four receiving channels 32.

Currently, there are two types of CPO modules defined in the optical internetworking forum (OIF) standard. The first type of CPO module is referred to as an 8×400 Gb/s DR4 module and used for 500 m distance transmission. This type of CPO module is operated with single 1311 nm wavelength in the parallel multiple optical fibers to realize the data transmission with 3.2 Tbit/s. The second type of CPO module is referred to as the 8×400 Gb/s FR4 module and applied for 2 km distance transmission. This type of CPO module adopts a WDM technique and uses 1271 nm, 1291 nm, 1311 nm, and 1331 nm wavelengths for communication to realize a data transmission rate of 3.2 Tbit/s.

As only two fibers connect to the terminal of a coarse-wavelength-division-multiplexing (CWDM4) module, increases in bandwidth must be accomplished through the two fibers. Through use of WDM through the MUX and DeMUX by the CWDM4 and DWDM4 modules, the transmitting density per single fiber may be increased.

In order for a CPO based switch to provide FR4 communication, a special integrating chip including an optical coupler, a WDM, an optical splitter, and a modulator is required. Aside from the special integrating chip, providing FR4 communication also involves integrating an external optical WDM and silicon photonics (SiP) chips in the CPO based switch.

FIG. 1B shows a block diagram of 4-channel CWDM photonics chip 40 such as an Intel 3.2 T CPO. The chip 40 has a set of integrated lasers 42 that produce different wavelength light output. The lasers 42 are coupled through a selector switch 44, a waveguide swizzle 46, and a ring resonator 48 to a MUX 50. The output of the MUX 50 is coupled to a V-groove connector 52 that is coupled to fiber. Received signals are fed through a DEMUX 56 and a photo-detector 58.

Because an external WDM module, like the AWG and the TFF components, is widely applied in mainstream modules, e.g., 100G LR4 and FR4 modules, an external WDM design has certain reliable stability. Therefore, such modules have high acceptability and are widely used in data centers. However, a 3.2 Tb/s CPO module in an 8×400 Gb/s FR4 requires 16 sets of external WDM modules to reach a FR4 CPO module. Based on 20 mm width of a CPO module from the OIF standard definition, and the fiber management required by the WDM module, integrating external WDM components in a 3.2 Tb/s CPO module becomes challenging due to space considerations.

FIG. 2 is a perspective view of a prior art CPO based switch assembly 200. FIG. 3 is a side view of the CPO based optical switch assembly 200 in FIG. 2. The switch assembly 200 includes a chassis housing 210 having a front panel 212 and a mother board 214. The switch assembly 200 further includes other support components 216, which can include a power supply, fans, and a vent window. The mother board 214 includes a high speed board 220 for performing switching functions. The mother board 214 includes circuit components such as resistors, capacitors, mounted chips, inductors, and heatsinks. The high speed board 220 includes a series of co-packaged optical (CPO) modules 222 that are installed around an ASIC 224 and provide optical signals transmitted and received by the ASIC 224. The CPO modules 222 may be the photonics chip 40 shown in FIG. 1B.

The circuit length between an optical engine (OE) of the CPO modules 222 and the switch circuit such as the ASIC 224 in the CPO switch architecture is shortened. The CPO switch architecture can allow increased density due to embedding the optical engine and the switch circuit on the same package. The front panel 212 is a metal frame structure that supports external ports for accepting fibers and internal connectors. The CPO modules 222 are connected to connectors in the front panel 212 by a series of optical fibers 226. The connectors in the front panel 212 allows unidirectional or bidirectional signal transmission through optical laser drive ports 230 and optical data ports 232. Each of the ports 230 and 232 have adaptors that route the signals from those ports to internal components.

Optical fibers are made of a particular glass material. The specific refractive index difference between the core and cladding of an optical fiber allows total reflection of light in the core to occur. If the fiber contacts a heat source for a long term period, the phenomena of fiber length extension and refractive index variation under high temperature may result in error coding in signals passed through the fiber. Moreover, the contact with a heat source also may damage the protective coating layer around the fiber glass layer. The corroded coating layer may expose the fiber glass layer to the atmosphere. The alkaline material in air may corrode the exposed fiber glass layer, resulting in fiber failure. Therefore, proper optical fiber management in a CPO based switch will be directly related to the lifetime of the CPO switch.

An input/output (I/O) tray serves as a system medium to receive and emit signals in concert with a CPO module. For example, an input from one terminal through internal circuit layout to another terminal output is typical for an electronic system. The communication between systems is accomplished through a cable that connects the terminals of each instrument to transmit electronic signals, i.e., a keyboard, or a mouse as input instruments, and a screen, an audio device, or a printer as output instruments. Hence, the traditional I/O tray serves as a medium to transmit electronic signals between systems. An I/O tray for transmitting optical signals is termed an optical I/O tray as opposed to a traditional I/O tray.

FIG. 4A shows side view diagrams of optical input/output trays 430 and 460 installed in respective CPO-based switch assembles 400 and 450. FIG. 4B shows a block diagram of the optical input output trays 430 and 460 that are used in the switch assemblies 400 and 450 in FIG. 4A. The switch assemblies 400 and 450 each include a housing 410 that has a front panel 412 that includes an optical adapter 414. The housing 410 supports a motherboard 416 that communicates with a high speed board 418 via an interposer 420. An ASIC 422 is mounted on the high speed board 418 to handle switching of signals. A series of CPO modules represented by a CPO module 424 in the assembly 400 and a CPO module 452 in the assembly 450 provides the interface between optical signals and the ASIC 422. The front panel 412 has connectors for a laser input 426 and connectors 428 for optical data signals.

The first switch assembly 400 does not have WDM capability and thus only operates on single wavelength optical signals. The prior art input output tray 430 is interposed between the internal components 424 on the high speed board 418 and the external adapters 414. The prior art input tray 430 includes a laser light source input 432 coupled to a single wavelength ELS module 440 that emits single wavelength light sources to the laser light source input 432. The laser light signal is routed through internal fiber management 434 to provide a laser light input 436 to the CPO module 424.

Transmitted and received optical data signals are routed from a first data signal connector 442 on the input/output tray 430 through internal fiber management 444 to a data signal connector 446 that is coupled to the CPO module 424 via an optical fiber 438.

The second switch assembly 450 has the same components in the housing 410 but has a special CPO module 452 that includes CWDM components 454 for processing multi-wavelength optical signals. The CPO module 452 and CWDM components 454 are connected to the prior art input/output tray 460 to exchange optical signals between the optical adapter 414. The prior art input/output tray 460 is coupled to an ELS module 456 that provides different wavelength laser light sources to a laser input 462 that is routed through internal fiber management 464 to provide laser light to a laser input 466 to the CPO module 452. Transmitted and received optical data signals are routed from a first connector 472 on the input output tray 460 through internal fiber management 474 to a connector 476 that is coupled to the CPO module 452 and CWDM components 454 via optical fibers 458. The prior art input/output trays 430 and 460 assist in fiber management, but still require exposed optical fibers. Moreover, WDM operation still requires a specialized CPO module 452 with the integrated WDM components 454.

Thus, there is a need for an optical input/output tray that supports multi-wavelength optical signals by integrating WDM components. There is a further need for an optical input/output tray that eliminates the need for optical fibers in a switch assembly. There is also a further need for an optical input/output tray that may be easily installed in a switch assembly housing.

SUMMARY

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

According to certain aspects of the present disclosure, an optical input/output tray for insertion in a switch assembly is disclosed. The switch assembly has a co-packaged optics module with an optical data signal input and a laser input, and a front panel. The optical input/output tray includes a housing insertable in the switch assembly. A first set of adapters are connectable to the optical data signal input and laser input of the co-packaged optics module. A second set of adapters is connectable to the front panel. A WDM component converts multi-wavelength signals from the first set of adapters to a single multiplexed signal coupled to the second set of adapters. The WDM component converts a single multiplexed signal from the second set of adapters to multi-wavelength signals coupled to the first set of adapters. A fiber management structure in the housing communicates optical signals between the first set of adapters, the WDM components, and the second set of adapters.

In another disclosed implementation of the example input/output tray, the WDM component is in proximity to the first set of adapters in the housing. In another disclosed implementation, the housing has a top surface. The first set of adapters is positioned on sides of the top surface. In another disclosed implementation, the fiber management structure is contained in the center of the housing relative to the sides of the top surface. In another disclosed implementation, the co-packaged optics module is one of a plurality of co-packaged optics modules on a high-speed circuit board. The input/output tray, when inserted in the switch assembly, positions the sides of top surface under the high-speed circuit board such that the first set of adapters are in proximity with the plurality of co-packaged optics modules. In another disclosed implementation, the example input/output tray further includes a WDM module attached to the housing at a proximal end to the front panel. The WDM module holds the WDM component coupled to the second set of adapters. A third set of adapters is coupled to the WDM component and coupled to the fiber management structure. In another disclosed implementation, the WDM module is removable from the housing. In another disclosed implementation, the WDM module includes a plurality of removable submodules each including a circuit board mounting a WDM component.

Another disclosed example is a switch that includes an optical switching controller and a co-packaged optical module having an optical data signal input and a laser input. The co-packaged optical module is coupled to the switching controller. A front panel has couplers for an external laser source and an external optical signaling device. An optical input/output tray has a first set of adapters coupled to the optical data signal input and laser input of the co-packaged optical module. A second set of adapters is coupled to the front panel. A WDM component converts a plurality of multi-wavelength signals from the first set of adapters to a single multiplexed signal coupled to the second set of adapters. The WDM component converts a single multiplexed signal from the second set of adapters to a plurality of multi-wavelength signals coupled to the first set of adapters.

In another disclosed implementation of the example switch, the example switch includes a motherboard and a high speed circuit board mounted on the motherboard. The high-speed circuit board supports the switching controller and the co-packaged optical module. The optical input/output tray includes a housing insertable under the motherboard. In another disclosed implementation, the WDM component is in proximity to the first set of adapters in the housing. In another disclosed implementation, the housing has a top surface. The first set of adapters is positioned on sides of the top surface. In another disclosed implementation, the fiber management structure is contained in the center of the housing relative to the sides of the top surface. In another disclosed implementation, the co-packaged optics module is one of a plurality of co-packaged optics modules on a high speed circuit board. The input/output tray, when inserted in the switch assembly, positions the sides of top surface under the high speed circuit board such that the first set of adapters are in proximity with the plurality of co-packaged optics modules. In another disclosed implementation, the example input/output tray further includes a WDM module attached to the housing at a proximal end to the front panel. The WDM module holds the WDM component coupled to the second set of adapters. A third set of adapters is coupled to the WDM component and coupled to the fiber management structure. In another disclosed implementation, the WDM module is removable from the housing. In another disclosed implementation, the WDM module includes a plurality of removable submodules each including a circuit board mounting a WDM component.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

DETAILED DESCRIPTION

Figure 1A:
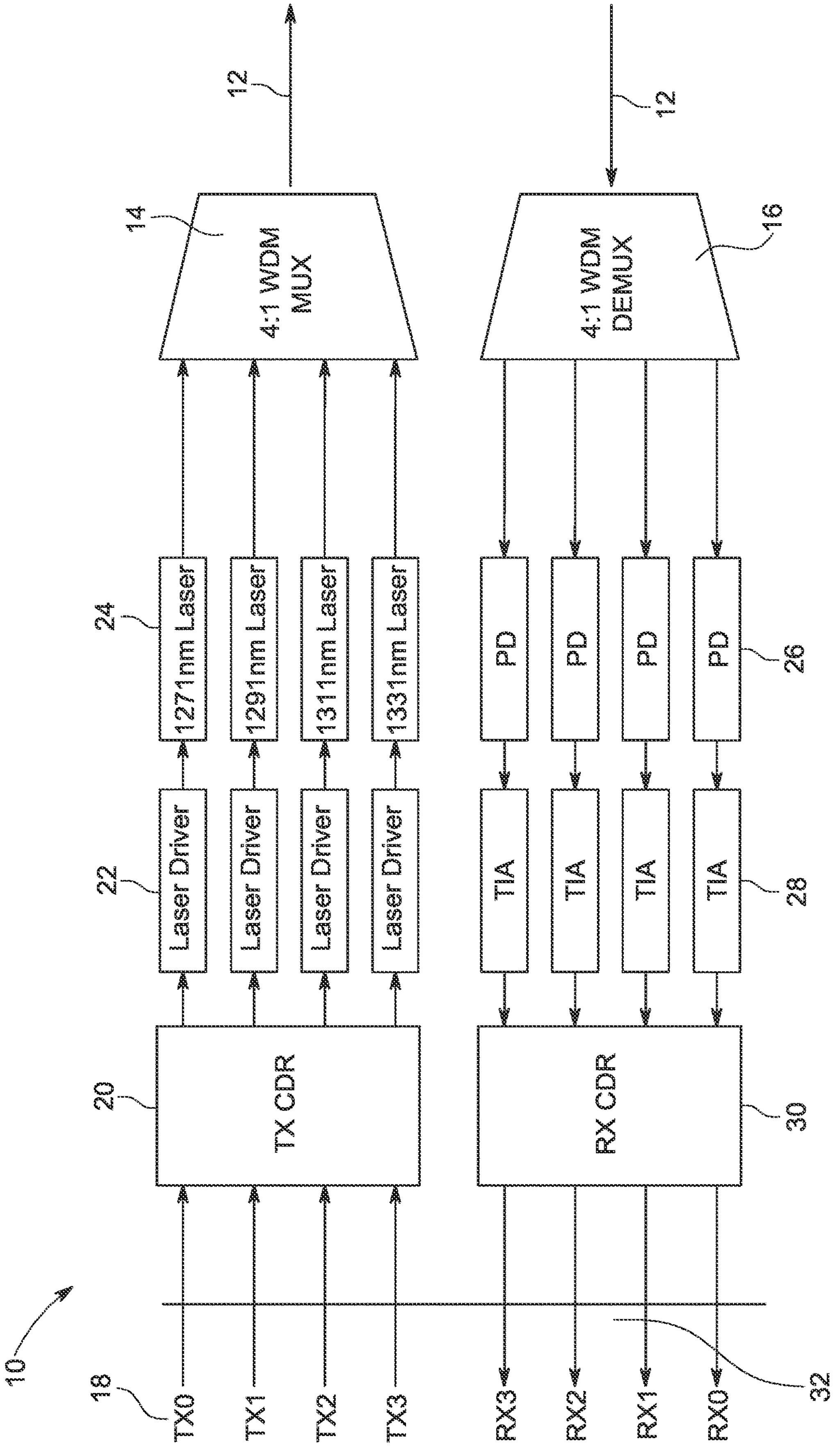
FIG. 1A (PRIOR ART)
FIG. 1A is a block diagram of a prior art WDM transceiver system.
Figure 1B:
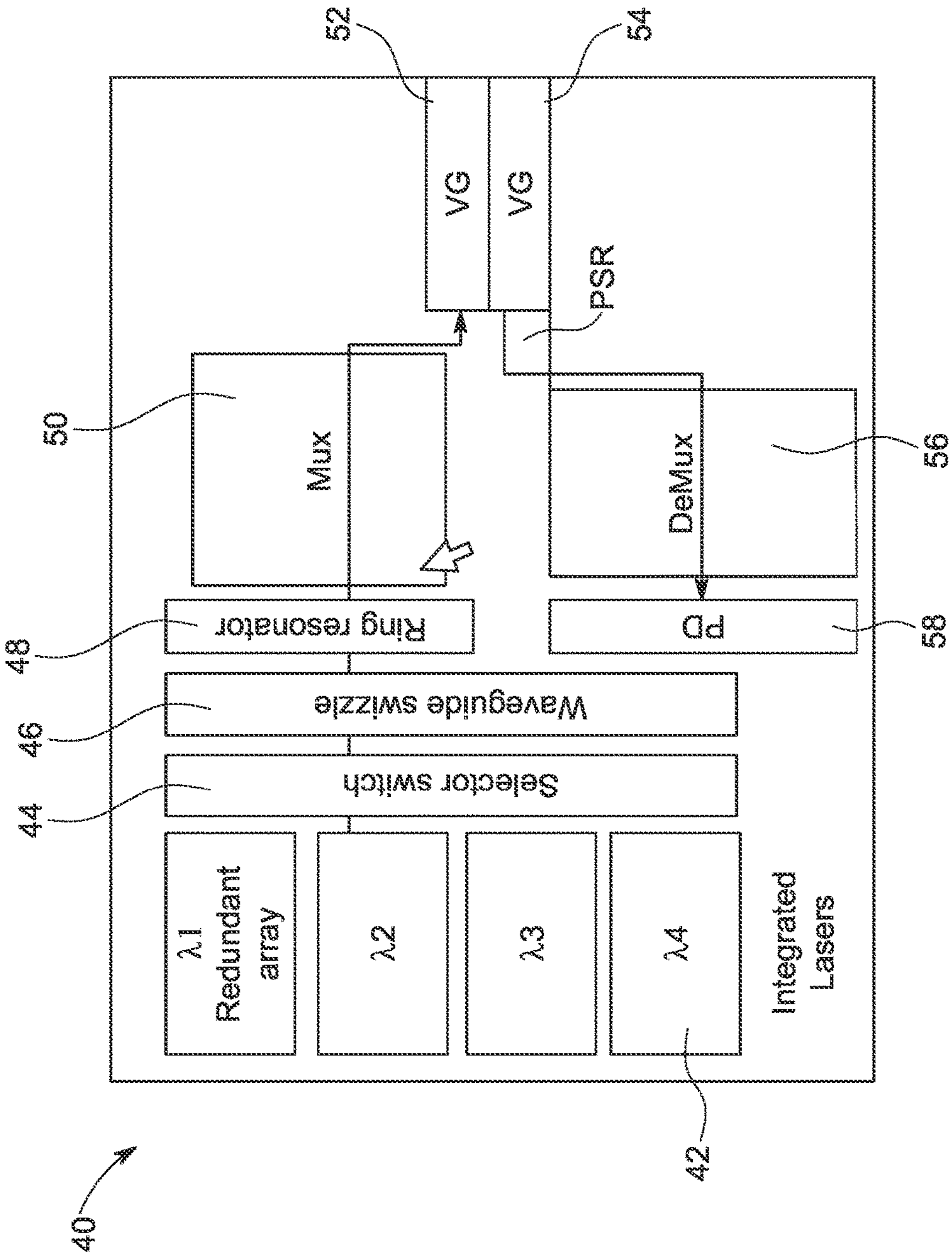
FIG. 1B (PRIOR ART)
FIG. 1B is a block diagram of a prior art photonics chip.
Figure 2:
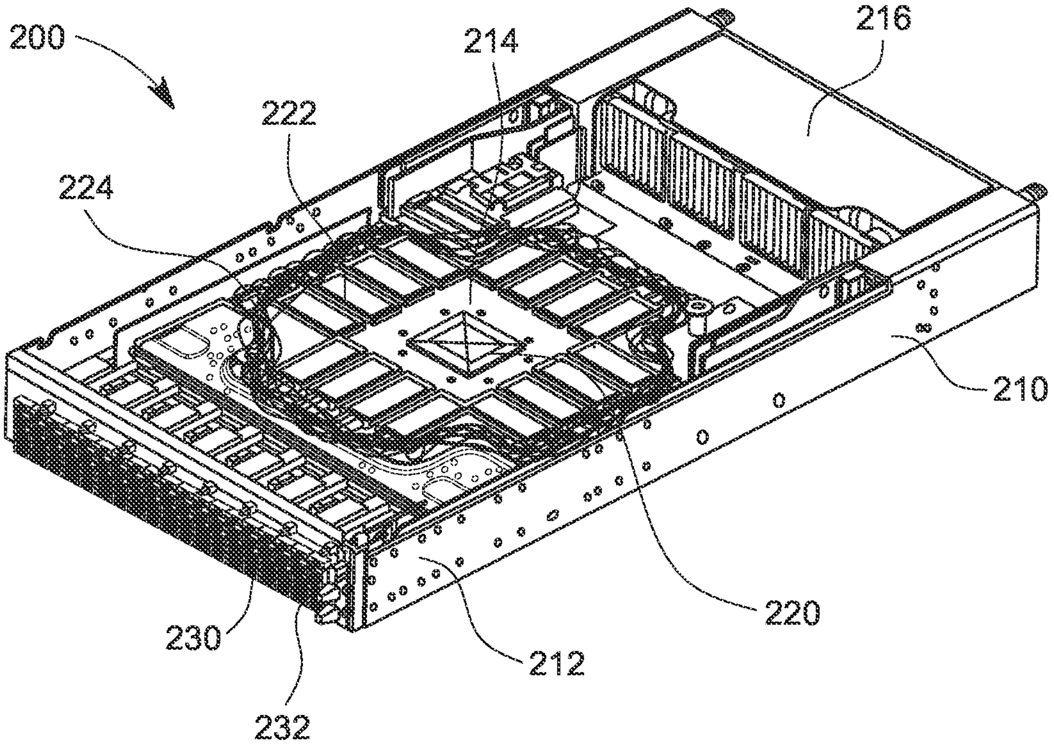
FIG. 2 (PRIOR ART)
FIG. 2 is a perspective view of a prior art switch assembly.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word “including” means “including without limitation.” Moreover, words of approximation, such as “about,” “almost,” “substantially,” “approximately,” and the like, can be used herein to mean “at,” “near,” “nearly at,” “within 3-5% of,” “within acceptable manufacturing tolerances of,” or any logical combination thereof. Similarly, terms “vertical” or “horizontal” are intended to additionally include “within 3-5% of” a vertical or horizontal orientation, respectively. Additionally, words of direction, such as “top,” “bottom,” “left,” “right,” “above,” and “below” are intended to relate to the equivalent direction as depicted in a reference illustration; as understood contextually from the object(s) or element(s) being referenced, such as from a commonly used position for the object(s) or element(s); or as otherwise described herein.

The disclosure is directed toward an integrated optical input/output tray for optical components such as switches. The input/output tray allows optical WDM components currently required in a CPO module to be integrated in the tray to allow multi-wavelength capability from a switch. The difficulty of integrating external WDM components in a CPO module is thus avoided. By switching an optical fiber input/output tray in single wavelength applications to an example optical fiber input/output tray that supports multi-wavelength application, a multi-wavelength CPO switch may be designed with the same size as a switch for single wavelength applications. More importantly, CPO modules are compatible between single and multi-wavelength switches with the use of the example optical fiber input/output tray.

The example optical input/output tray has optical WDM elements for interfacing with co-packaged optical (CPO) modules. The example optical input/output tray includes a housing and a set of terminated optical fibers managed within the housing. The example optical input/output tray may include an assembled box housing including optical WDM elements connecting to terminated optical fibers. The example optical input/output tray has a first set of adapters, and a second set of adapters. The first set of adapters may exchange optical signals with the CPO modules. The second set of adapters can be connected to other external electronic systems, such as servers to exchange data that requires switching between components. Each of the terminated optical fibers is terminated with a fiber connector on each end of the optical fiber. An optical WDM element can be connected to a first and second set of adapters by optical fiber, respectively. The first set of adapters is configured to facilitate connecting the plurality of terminated optical fibers to the CPO modules via terminated jumper optical fibers separate and distinct from the terminated optical fibers. The example optical input/output tray, through the combination of the first and second sets of adapters, facilitates communication between the CPO modules of a switch assembly and the one or more electronic systems.

Figure 5A:
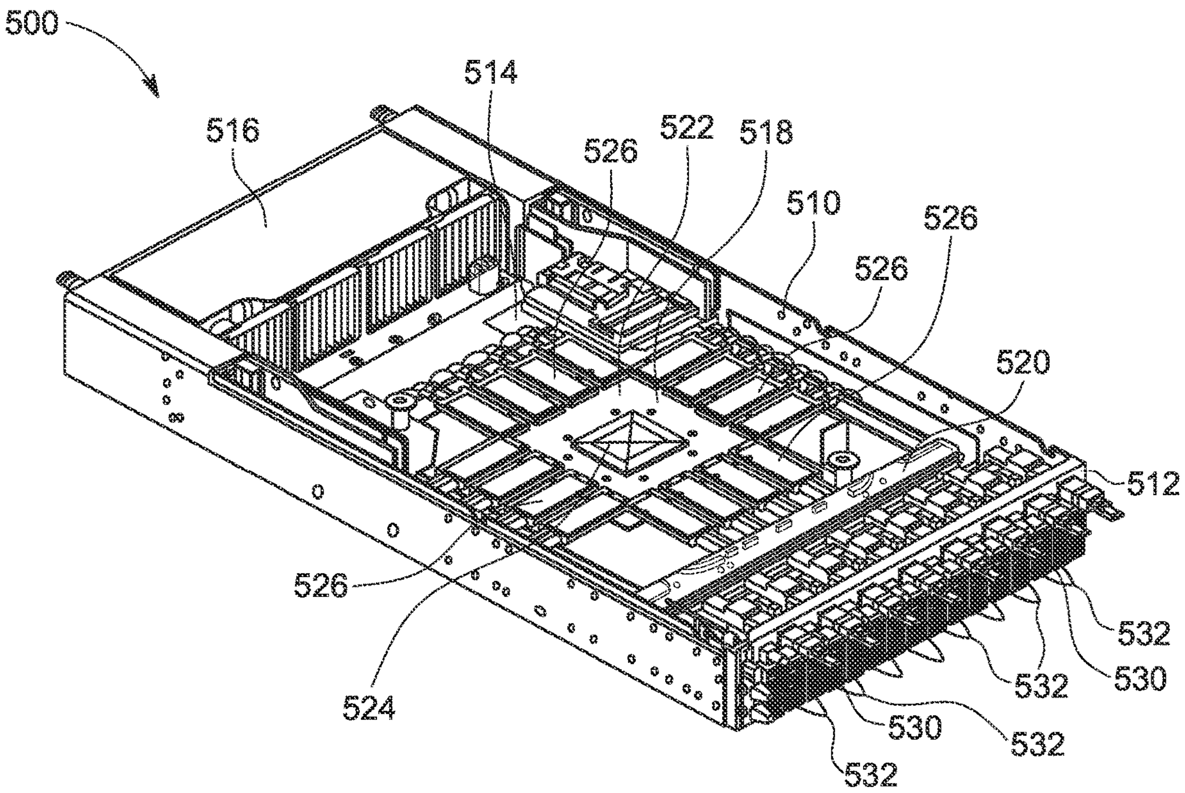
FIG. 5A is a perspective view of a switch assembly that incorporates the example optical input/output tray, according to certain aspects of the present disclosure.
Figure 5B:
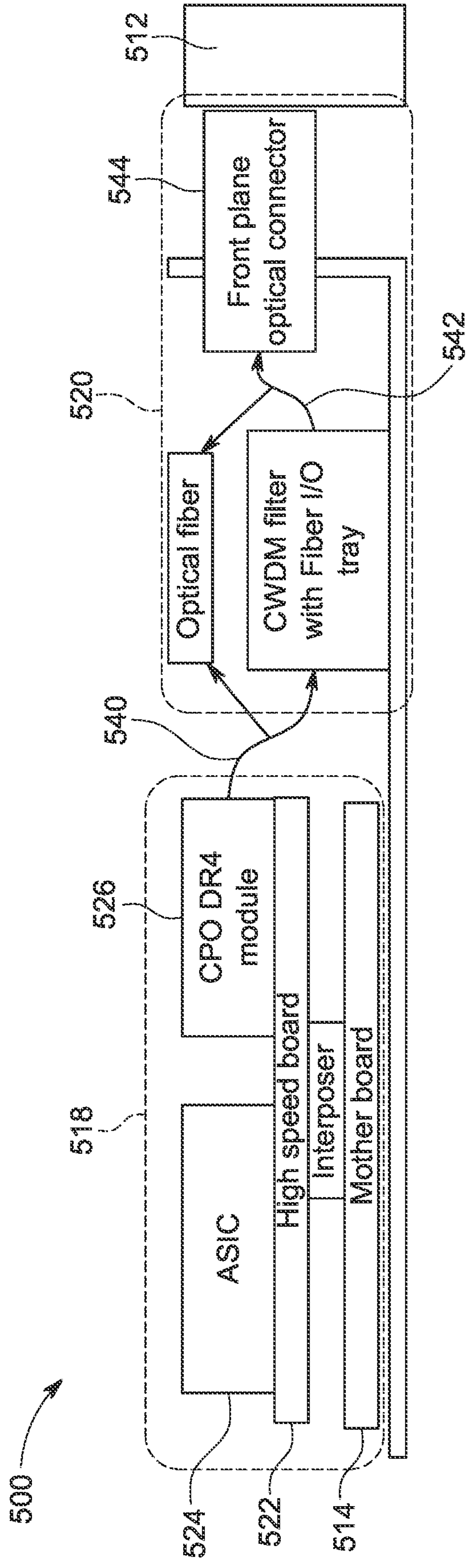
FIG. 5B is a side view of the switch assembly and optical input/output tray, according to certain aspects of the present disclosure.

FIG. 5A is a perspective view of an example optical component, which in this example is a switch 500. FIG. 5B shows a side view of the switch 500. The switch 500 has a housing 510 that includes a front panel assembly 512, a motherboard 514, a support component area 516, an optics host assembly 518, and an example optical input/output tray 520. The housing 510 holds support components, such as a power supply and fans in the support component area 516, and other components such as memory devices and controllers.

The switch 500 switches optical data signals transmitted to and received by external networked devices, such as servers, through connectors and adaptors on the front panel assembly 512. Incoming and outgoing optical data signals are routed between the optics assembly 518 and the front panel assembly 512 via the example optical input/output tray 520. The front panel assembly 512 typically includes a metal frame that supports the different adapters and connectors. The optical input/output tray 520 is designed to be mated with the housing 510 and internal components such as the motherboard 514. The switch 500 is based on co-packaged optics (CPO) modules that manage transmitting and receiving optical signals to and from switching components.

The optics assembly 518 includes a high-density organic substrate circuit board 522 for high-speed components, a switch controller 524, and co-packaged optical (CPO) modules 526. In this example, there are sixteen optical modules 526 arrayed in groups of four on the sides of the high-speed circuit board 522. In this example, the switch controller 524 is an application specific integrated circuit (ASIC), but any suitable controller, such as a central processing unit (CPU), a field programmable gate array (FPGA), or other processor, may be used. Each of the optical modules 526 has three array ports. One of the array ports transmits optical data signals 622 in FIG. 6, while a second electronic array port receives electronic data signals from the circuit board 522. In this example, these ports are connected to the ASIC 524. The third array port of the optical modules 526 is optically connected to an external laser light source 620 in FIG. 6, through the input/output tray 520, to receive a continuous wave laser drive signal to drive the optical module 526.

In this example, there are eight external laser source modules 530, each corresponding to two of the optical modules 526. The external laser source modules 530 are mounted on the front of the front panel assembly 512. The optical modules 526 have electronic connection pins that connect to the ASIC 524 through the high-speed board 522. The optical modules 526 are arranged around the switch controller ASIC 524. The switch controller ASIC 524 includes switching logic for routing signals between the optical modules 526 through the connection pins.

Each of the external laser source modules 530 is plugged into corresponding sockets on the front panel assembly 512 of the housing 510. The front panel assembly 512 includes power sockets that supply power to the plugged-in external laser source modules 530. The external laser source modules 530 are arranged according to two rows of sockets on the front panel assembly 512. As will be explained, each of the external laser source modules 530 emit a continuous wave laser output signal to the sockets. The laser output signals are provided to the respective external laser source modules 530 via an optical fiber jumper cable 532 that is coupled to an input of the optical input/output tray 520. The optical fiber jumper cable 532 has a series of channels (for example eight channels) with one end connected to the external laser source module 530. Thus, each of the external laser source modules 530 has one jumper cable 532 that provides the laser output signal to a respective two optical modules 526 through the input/output tray 520.

In this example, the external laser source module 530 is a standard pluggable module that may be plugged into the corresponding sockets in the front panel assembly 512 of the switch 500. QSFP-DD and OSFP front-panel pluggable form factors are example form factor housings of the external laser source module 530. With such a pluggable module design, the external laser source module 530 may be powered-up and managed though any of the eight QSFP-DD or OSFP sockets in the front panel assembly 512.

The optical input/output tray 520 is interposed between the front panel assembly 512 and the optics host assembly 518. As shown in detail in FIG. 5B, the input/output tray 520 has a first set of adapters 540 that transmit and receive optical signals and provide the light signal to the optical modules 526 through a connector. The adapters 540 are optically connected through a connector to internal optical fiber 542 through a connector to a second set of adapters 544 that are coupled to the sockets on the front panel assembly 512 that are coupled to the laser source modules 530. Thus, optical management is provided by the example optical input/output tray 520. The input/output tray 520 can be conveniently installed and removed from the housing 510 of the CPO switch 500. The input/output tray 520 may be positioned below the motherboard 514 in alignment with the high-speed circuit board 522.

The optical fiber management components contained in the example input/output tray 520 allow for reduced wind resistance in the interior of the housing 510 because hundreds of optical fibers are not required in the interior of the housing (as compared to conventional switches). In known housings, the optical fibers block air flow through the interior of the housing 510 and thus impede cooling. The example input/output tray 520 thus also improves heat flow throughout the housing 510 of the switch 500 by removing the optical fibers in the interior of the housing 510, thereby improving heat flow. The example optical input/output tray 520 reduces the chance of breaking optical fibers during maintenance, since the optical fibers are not coiled around other electronic elements on a circuit board in the switch housing. Due to lack of coiling around the other electronic elements, optical fibers in the input/output tray 520 do not directly come in contact with heat sources in the interior of the housing 510 of the switch 500. The input/output tray 520 also standardizes the distance between optical fiber management from the CPO modules 526 to connectors leading to the front panel assembly 512.

Figure 6:
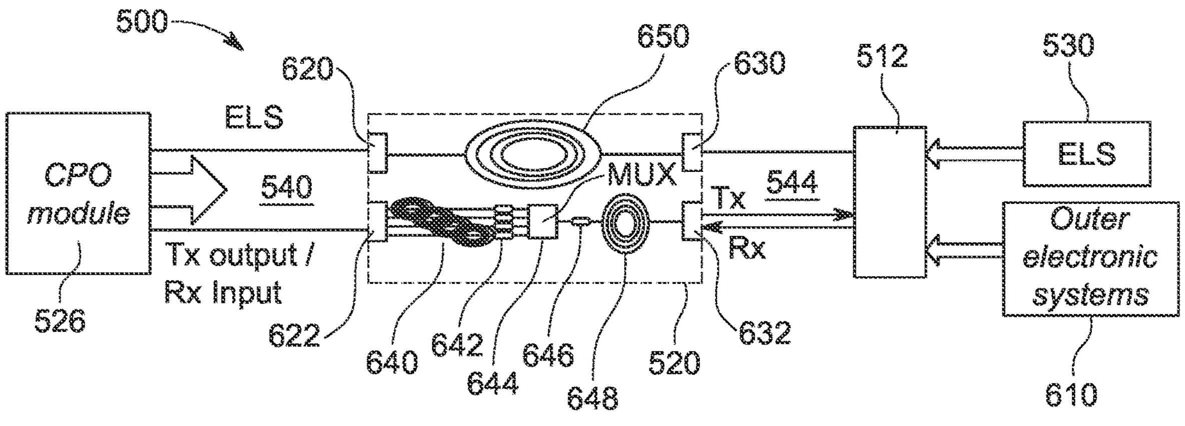
FIG. 6 is a block diagram of the example optical input/output tray passing optical signals between the switch assembly and external components, according to certain aspects of the present disclosure.

FIG. 6 shows a block diagram of the components of the example input/output tray 520 in relation to the switch 500 and external systems. The input/output tray 520 includes the first set of adapters 540 that are coupled to connectors of the CPO modules 526. The second set of adapters 544 are coupled through connectors to the outer electronic systems through the front panel assembly 512. The front panel assembly 512 serves as the interface between the switch 500 and other systems 610 such as servers. The first set of adapters 540 include a laser drive signal adapter 620 and an optical data signal adapter 622. Correspondingly, the second set of adapters 544 include a laser source adapter 630 and an optical data signal adapter 632.

The optical data signal adapter 622 of the first set of adapters 540 output data signals generated by the switching components of the switch 500 through the optical module 526 to four separate optical fibers modulated with light at four different wavelengths. The fibers are coupled to fiber management 640 that is coupled to WDM components 644. The WDM components 644 combine the four light modulated signals into a single multi-wavelength multiplexed signal that is routed through fiber management 648 to the optical signal adapters 632 of the second set of adapters 544. Laser signals generated by the external laser source 530 in FIG. 5 are sent to the laser source adapter 630 through fiber management 650 to the CPO module laser source input adapter 620 of the first set of adapters 540.

When optical data signals are received from outer electronic systems such as the system 610, the signals are a single multi-wavelength multiplexed signal sent to the second set of adapters 632. After passing through the fiber management 648, the signal is coupled to the WDM components 644. The WDM components 644 separate the multiplexed signal into four signals at different wavelengths. The separated signals are sent through the fiber management 640 to a connector to the optical data signal adapter 622 for transmission to the optical module 526.

Figure 7A:
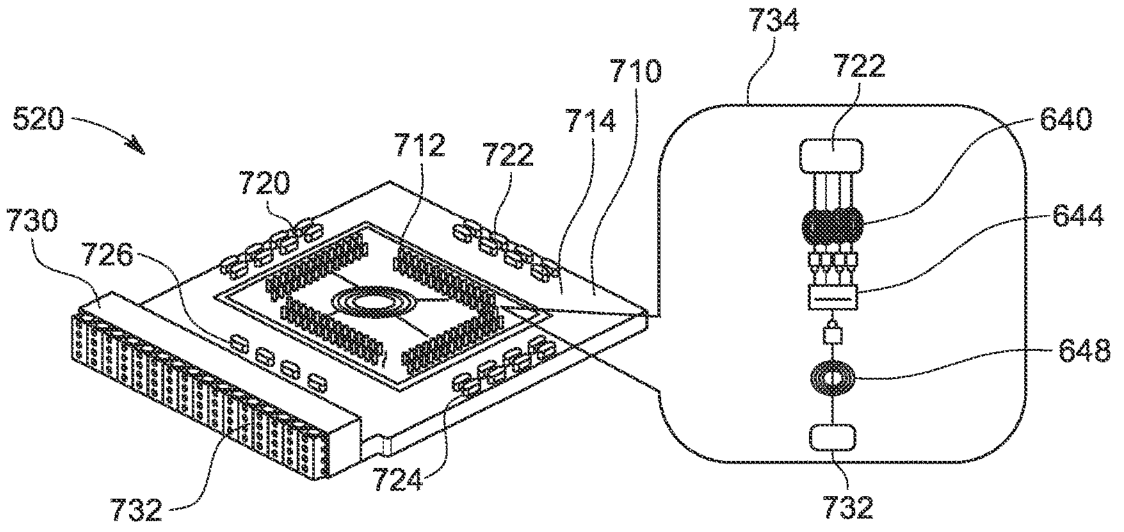
FIG. 7A is a perspective view of the example input output optical tray, according to certain aspects of the present disclosure.

FIG. 7A is a perspective view of the example input/output tray 520 in FIGS. 5A-5B. The input/output tray 520 has a housing 710 that has a top surface with a center area 712 and side areas 714. The housing 710 has a height and shape that allows the housing 710 to be inserted under the motherboard 514 in alignment with connectors on the high speed board 522 in FIG. 5A. Each of the four side areas 714 includes a set of adapters 720, 722, 724, and 726. Each side area 714 thus has eight individual adapters that may be coupled to connectors to the optical inputs of the CPO modules 526 in FIG. 5A when the input/output tray 520 is positioned under the motherboard 514 and the high speed board 522.

A front housing 730 includes a second set of adapters 732 that may be connected to the adaptors of the front panel assembly 512 to provide the laser light source and transmitted and received optical data signals. Each of set of adapters 720, 722, 724, and 726 have an outer set of four adapters that serve to transmit and receive optical data signals between the CPO module 526 and external devices that are connected to the second set of adapters 732. An inner set of four adapters are optically coupled via a connector to the CPO module laser input of the CPO modules 526 to provide a laser light source from the ELS module 530. The center area 712 has fiber management structures 734 that route optical fiber between the adapters 732 and the adapters 720, 722, 724, and 726. The WDM components 644 (shown in the inset) are located in the housing 710 under the center area 712. As shown in the inset, optical data signals received from the adapters 732 are routed through a connector to the fiber management structure 648 to the WDM components 644. The WDM components 644 separate the received signals into four optical data signals modulated at four different wavelengths through the fiber management structure 640 to the set of adapters such as the adapters 722 for connection to one of the CPO modules 526.

Figure 3:
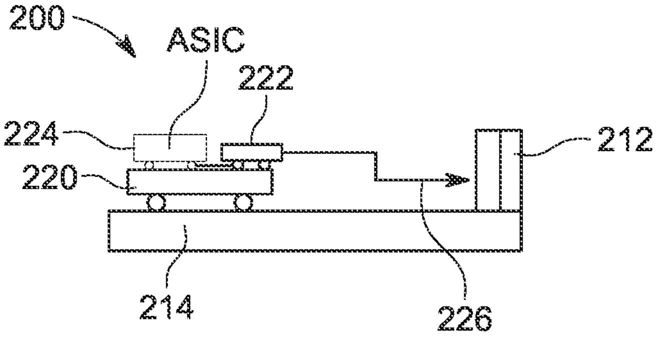
FIG. 3 (PRIOR ART)
FIG. 3 is a side view of the prior art switch assembly in FIG. 2.
Figure 4A:
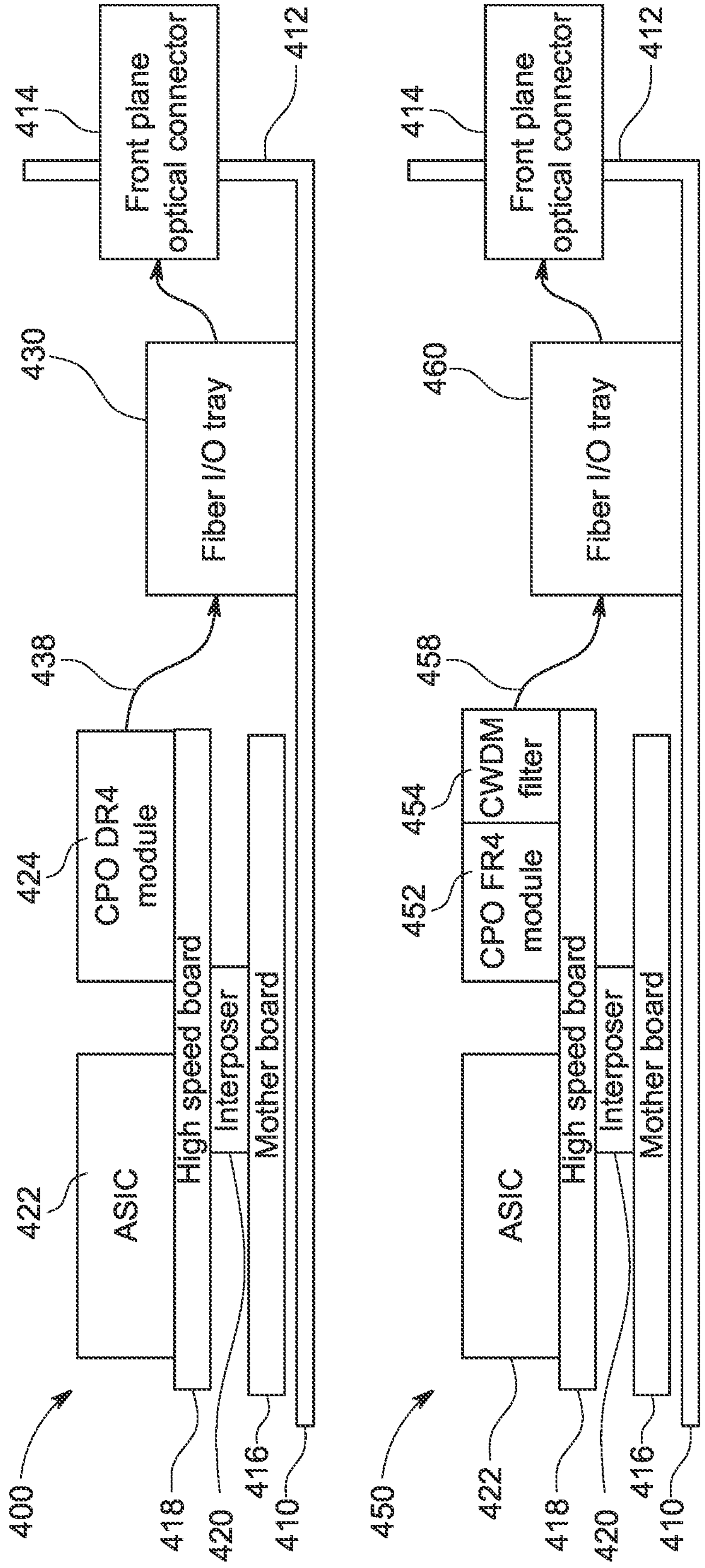
FIG. 4A (PRIOR ART)
FIG. 4A shows side views of switches using different prior art optical input/output trays.
Figure 4B:
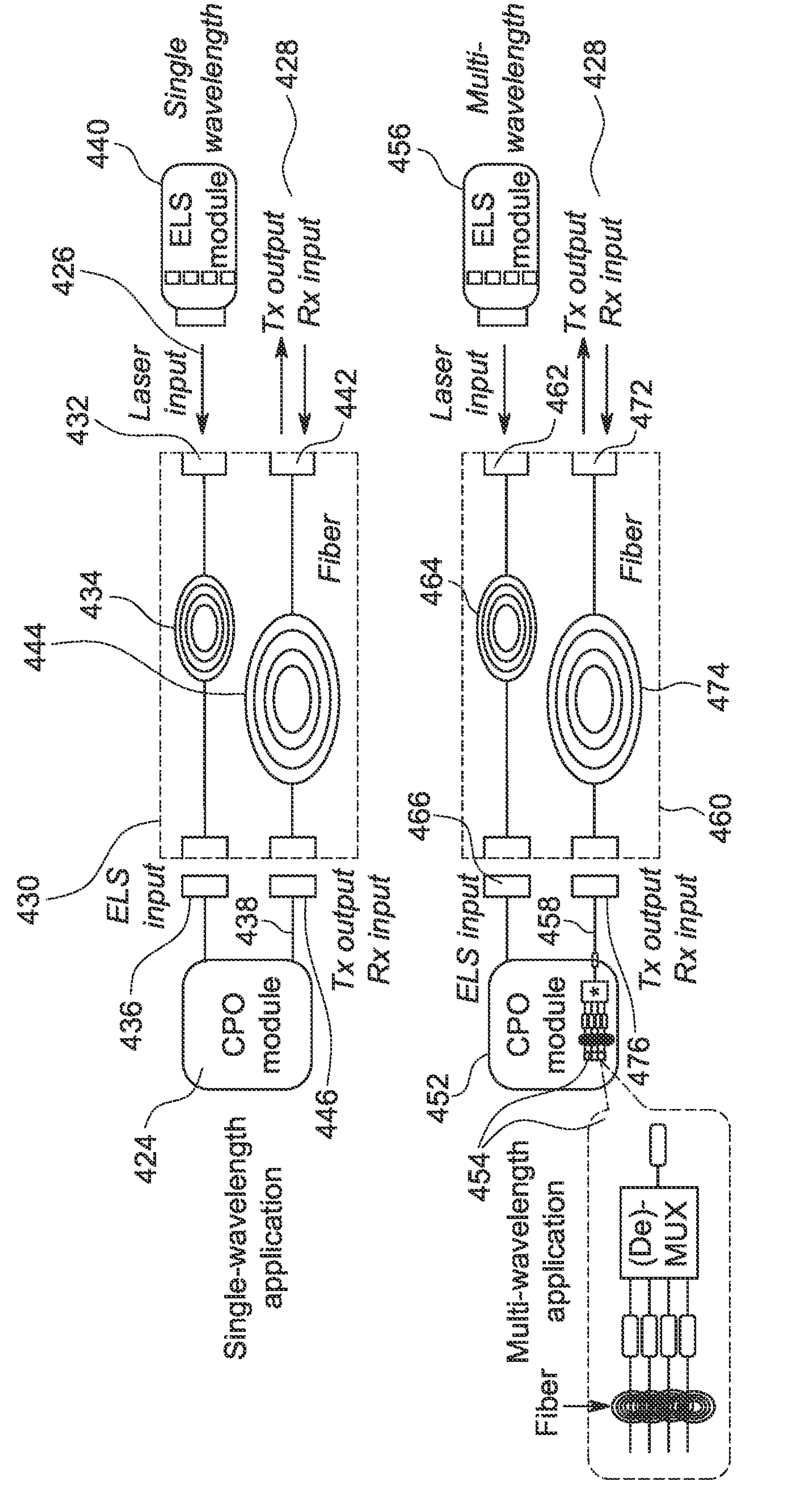
FIG. 4B (PRIOR ART)
FIG. 4B shows block diagrams of the prior art input output trays used with different optical switches in FIG. 4A.
Figure 7B:
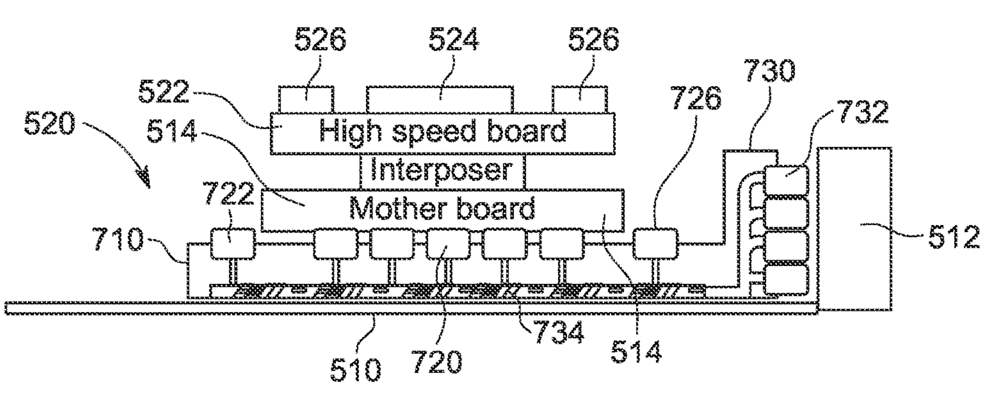
FIG. 7B is a is a side view of the input output optical tray, according to certain aspects of the present disclosure.

FIG. 7B is a side view of the input/output tray 520 in relation to the other components of the switch 500 in FIG. 5A. As may be seen in FIG. 7B, the input/output tray 520 may be positioned under the motherboard 514 and the high speed board 522. The CPO modules 526 on the high speed board 522 are in close proximity to the sets of adapters 720, 722, 724, and 726, thus minimizing the connection distance. The second set of adapters 732 may be connected to the front panel assembly 512 through plug in adaptors. The second set of adapters 732 communicate optical signals that are connected to external device systems 610 and ELS modules 530. Since the input/output tray 520 includes all WDM components to support multi-wavelength signals, it may be replaced by a single wavelength input/output tray similar to that shown in FIG. 3A. In this manner, the switch 500 may operate in a single wavelength mode by simply swapping out the input/output tray 520 and the front panel 512.

Figure 8A:
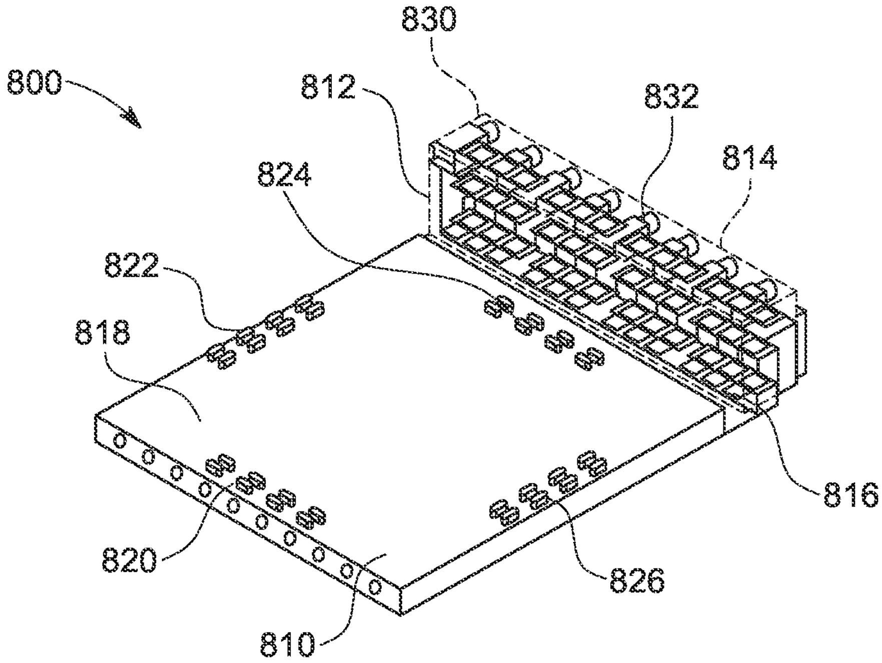
FIG. 8A is a perspective view of another example optical input/output tray with a module with the WDM components, according to certain aspects of the present disclosure.
Figure 8B:
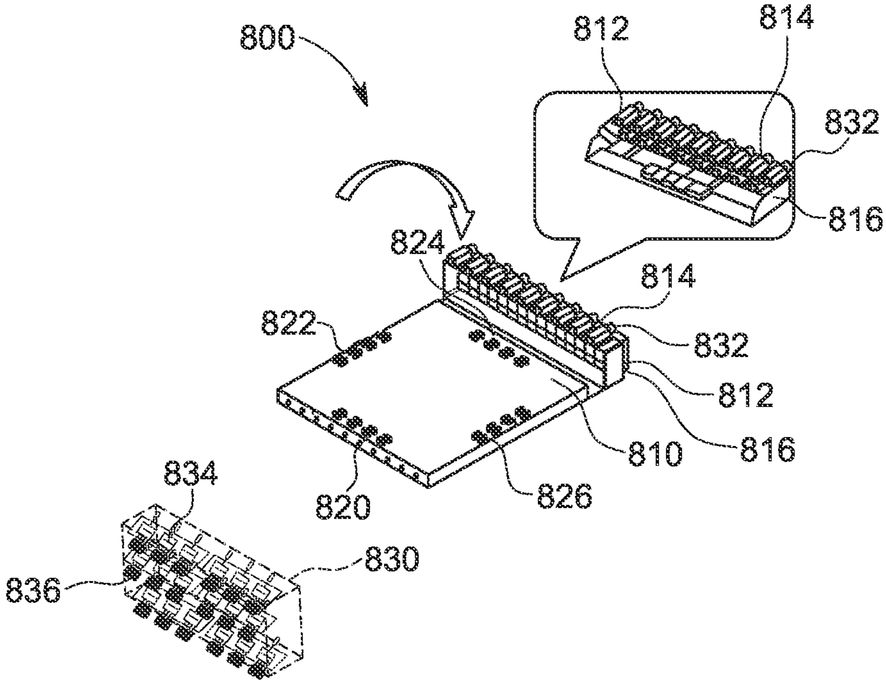
FIG. 8B is an exploded perspective view of the components of another example optical input/output tray with the module with the WDM components, according to certain aspects of the present disclosure.

FIG. 8A is a perspective view of another example input output tray 800 that may be used instead of the input/output tray 520 in FIGS. 5A-5B. FIG. 8B is an exploded perspective view of the components of the tray 800. The input output tray 800 has a housing 810 that is roughly rectangular in shape. The housing 810 has a front interface assembly 812 that has a front interface panel 814 and a support frame 816. The housing 810 has a top surface 818 with four side areas. Four sets of adapters 820, 822, 824, and 826 are located on each of the four sides of the top surface 818. Each set of adapters 820, 822, 824, and 826 comprise eight individual adapters. Thus, each of the side areas of the top surface 818 of the housing 810 have eight individual adapters that may be coupled via a connector to the CPO modules 526 on the high speed board 522 in FIG. 5A.

The front interface assembly 812 includes a second set of adapters 832 that extend from the front interface panel 814 and may be connected to the sockets of the front panel assembly 512 in FIG. 5A to provide the laser light source and the transmitted and received optical data signals. Each of the first set of adapters 820, 822, 824, and 826 on the sides of the top surface 818 have an outer set of four adapters that serve to transmit and receive optical data signals between the CPO module 526 and external devices that are connected to the second set of adapters 832. The inner set of four adapters are optically coupled through the input/output tray 800 to the laser output of the ELS module. A housing of a WDM module 830 holds WDM components 834. Signals received from the second set of adapters 832 are routed to the WDM components 834 via a connector. The WDM components 834 separate the received optical data signals into four optical signals at four different wavelengths to a third set of adapters 836. The third set of adapters 836 routes the separated optical data signals through optical fibers 838 in FIG. 9 to optical management components in the housing 810 for routing to the adapters 820, 822, 824, and 826.

Figure 8C:
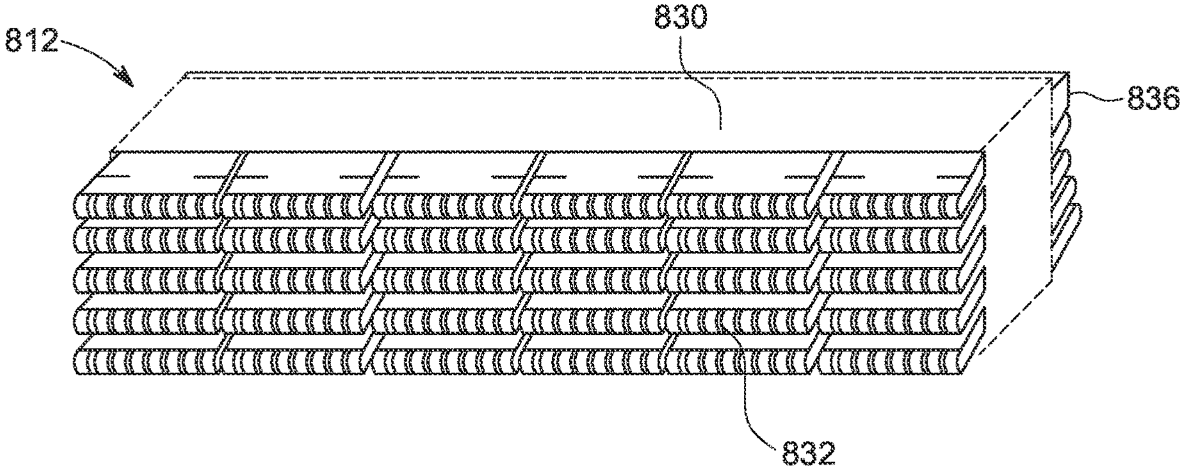
FIG. 8C is a front perspective view of the WDM module in FIG. 8A, according to certain aspects of the present disclosure.
Figure 8D:
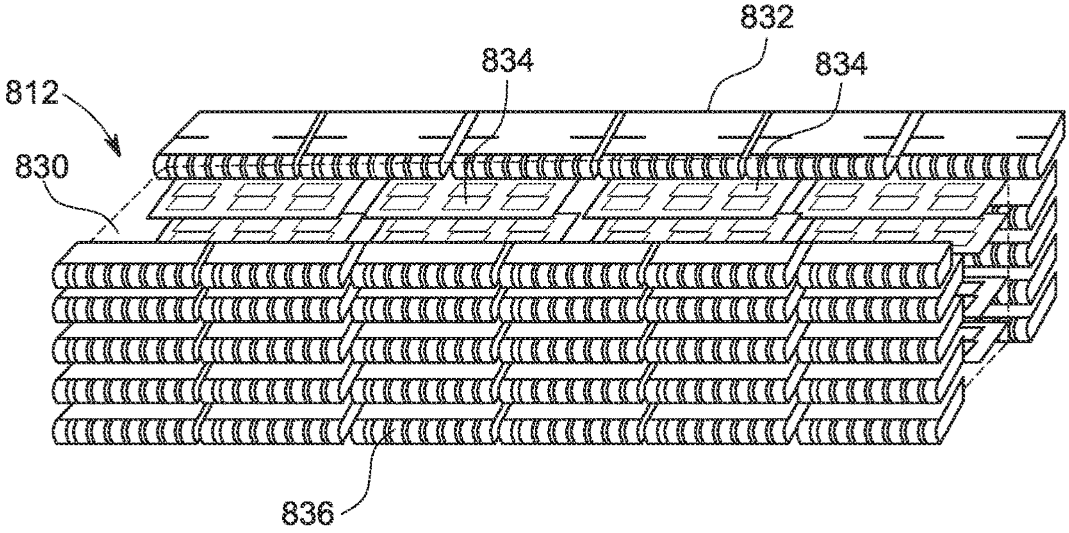
FIG. 8D is a rear perspective view of the WDM module in FIG. 8A, according to certain aspects of the present disclosure.
Figure 8E:
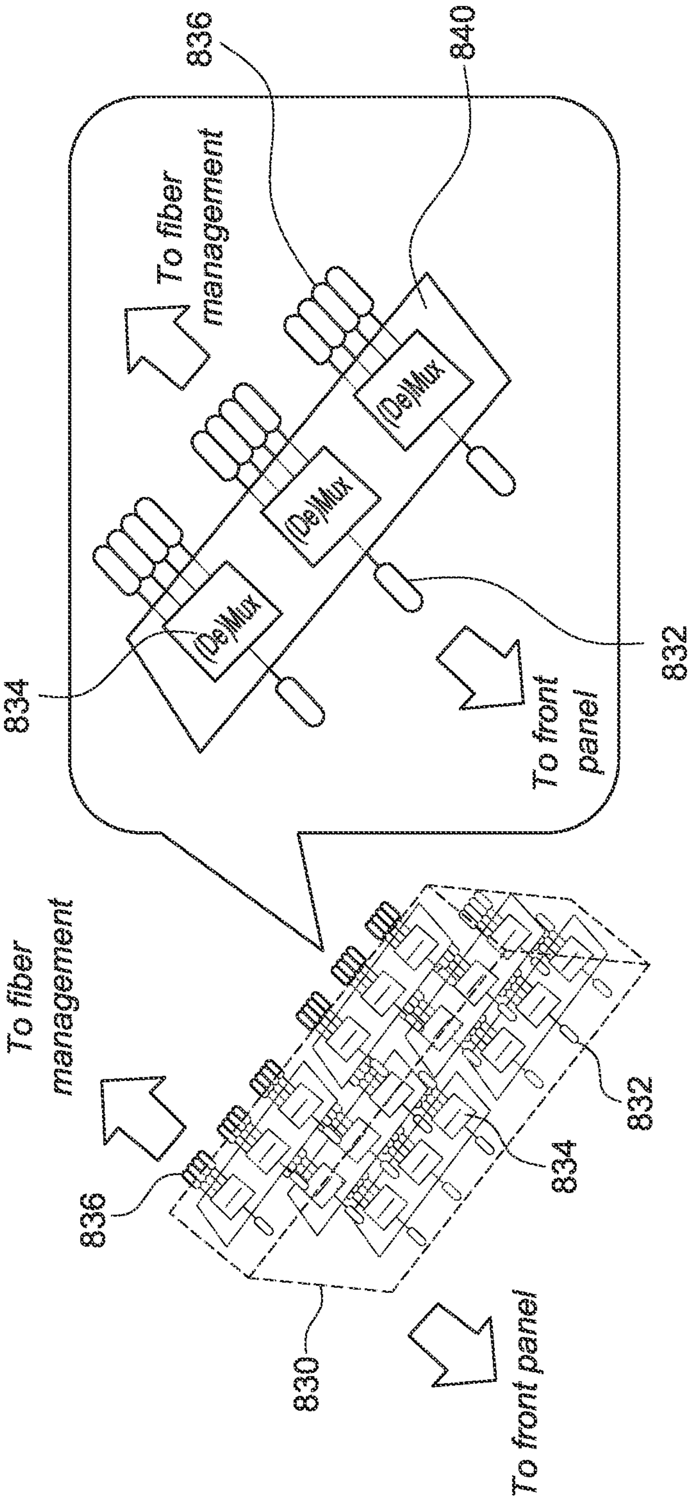
FIG. 8E is a top view of the WDM module in FIG. 8A, according to certain aspects of the present disclosure.

FIG. 8C is a front perspective view of the front interface assembly 812; FIG. 8D is a rear perspective view of the front interface assembly 812; and FIG. 8E is a top view of the WDM module 830. The housing of the WDM module 830 is shown in outline form in FIGS. 8D and 8E to show the internal WDM components 834. As will be explained the module 830 is attached to the front interface assembly 812 and the support frame 816.

The front panel 814 of the front interface assembly 812 has a second set of adapters 832 that are connected to the front of the switch 500. The housing of the WDM module 830 has internal connectors that connect to the adapters 832 to route signals to the WDM components 834. The WDM components 834 may exchange signals with the switch via the third set of adapters 836. Sets of the WDM components 834 are mounted on individual circuit boards 840 that are located in the housing of the module 830 in proximity to respective adapters 832 and 836.

Figure 9:
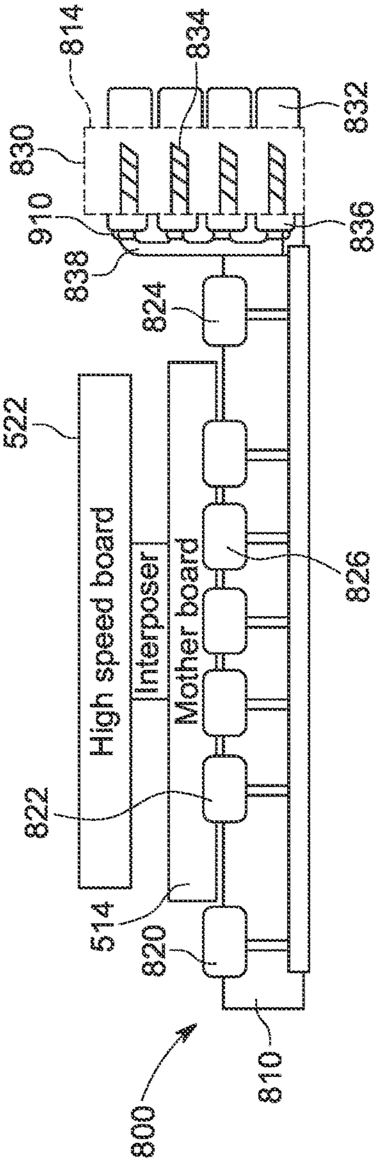
FIG. 9 is a side diagram of the example optical input/output tray in FIG. 8A installed in a switch.

FIG. 9 is a side view of the input/output tray 800 in relation to the other components of the switch 500 in FIG. 5A. As may be seen in FIG. 9, the input/output tray 800 may be positioned under the motherboard 514. The CPO modules 526 on the high speed board 522 are in close proximity to the adapters 820, 822, 824, and 826. The second set of adapters 832 may be connected to the adaptors of the front panel assembly 512 to in turn, be connected to external devices and ELS modules via external sockets of the front panel assembly 512. The third set of adapters 836 are connected to fiber connectors 910 that are coupled to internal optical fibers 838. The internal optical fibers 838 are coupled to the fiber management and the first set of adapters such as the adapters 820, 822, 824, and 826. The WDM housing 830 holds the circuit boards 840 with the WDM components 834 that perform multiplexing and demultiplexing on signals exchanged between the second set of adapters 832 and the third set of adapters 836.

Figure 10A:
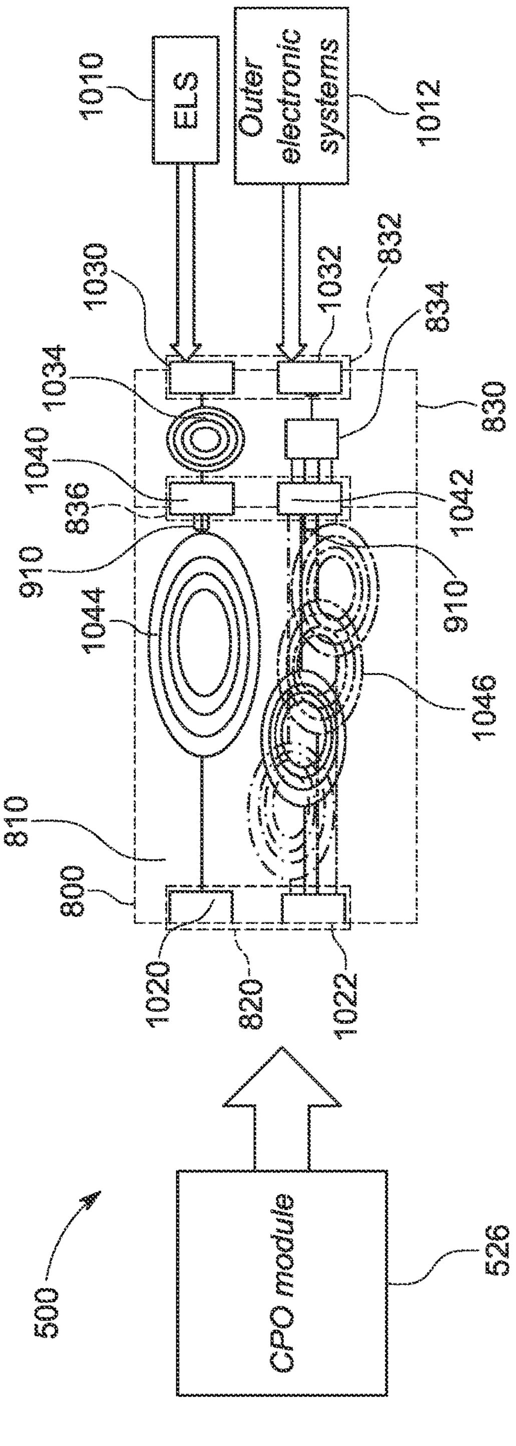
FIG. 10A is a block diagram of another example optical input/output tray with a module with the WDM components, according to certain aspects of the present disclosure.

FIG. 10A shows a block diagram of the operation of the input/output tray 800 in relation to other components of a switch such as the switch 500. The input/output tray 800 includes the first set of adapters such as the first set of adapters 820 that are coupled to the CPO module such as the CPO module 526. The second set of adapters 832 are coupled to an external laser system (ELS) module 1010 and outer electronic systems 1012 such as a server through the front panel assembly 512. The front panel assembly 512 serves as the interface between the switch 500 and the other external systems 1012 such as servers. The first set of adapters 820 include a laser source adapter 1020 and an optical data signal adapter 1022. Correspondingly, the second set of adapters 832 include a laser source adapter 1030 and an optical signal adapter 1032.

Laser light sources generated by the external laser source 1010 are sent to the laser source adapter 1030. The laser source adapter 1030 is tied through fiber management 1034 in the WDM housing 830 to a laser source adapter 1040 of the third set of adapters 836. The external laser light is then routed through a fiber management structure 1044 in the housing 810 to the laser source adapter 1020 of the first set of adapters 820.

Optical data signals received from the external systems 1012 are wavelength division multiplexed into a single optical signal. The signal is received by the optical data signal adapter 1032 of the second set of adapters 832. The signal is routed to the WDM components 834 which separate the signal into four signals at different wavelengths. The separated signals are then routed to an optical data signal adapter 1042 of the third set of adapters 836. The optical data signal adapters 1042 output signals to four separate fibers for the four different wavelength signals. The fibers are coupled to a fiber management structure 1046 that connects the signals to the optical data signal adapter 1022 of the first set of adapters 820. The four data signals are then passed to the optical module 526 and to the switching circuits of the switch 500.

Transmitted signals from the switch 500 are transmitted on signals of one of four wavelengths through the optical data signal adapter 1022 of the first set of adapters 820. The signals are routed through the fiber management structure 1046 through the optical data signal adapter 1042 to the WDM components 834. The WDM components 834 combine the four signals into a single multi-wavelength optical signal that is transmitted out of the adapter 1032 to the outer electronic systems 1012.

Similar to the example input/output tray 520 in FIG. 5A, the input/output tray 800 may be replaced with an input/output tray that supports single wavelength operation. In this manner, the switch 500 may be employed with single wavelength optical signals without any modification other than replacing the WDM input/output tray 800 and the front panel assembly 512.

Figure 10B:
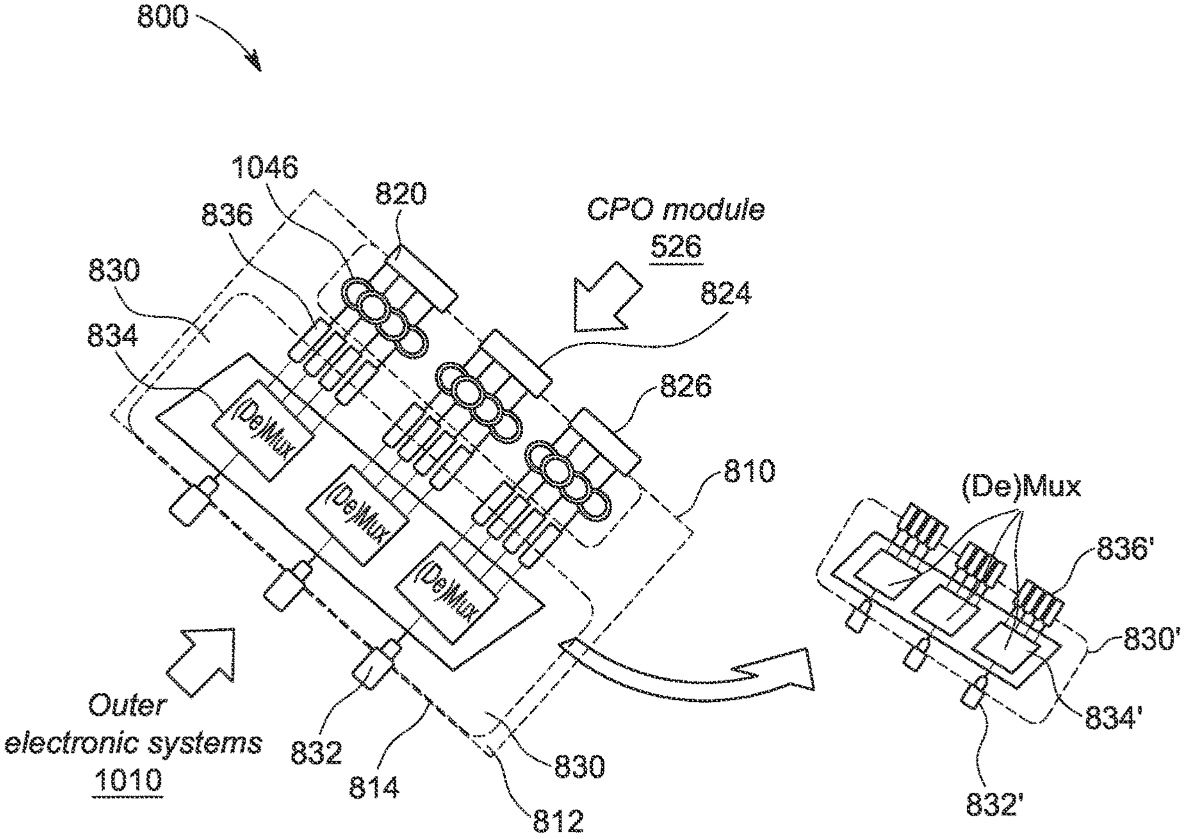
FIG. 10B is a block diagram of the replacement of the WDM module in FIG. 8A, according to certain aspects of the present disclosure.

The WDM housing 830 is also replaceable, which allows for easy replacement of the WDM components 834 without replacing other components of the input/output tray 800. The tray 800 may be removed from the switch and the housing 830 may be replaced with a new unit. FIG. 10A-10B shows the replacement of the WDM housing 830. Like elements in FIGS. 10A-10B are labeled with identical reference numbers as in FIGS. 8-9. As shown in FIGS. 10A-10B, the WDM module 830 is a replaceable unit with the second set of adapters 832, the WDM components 834, and the third set of adapters 836. The housing of the WDM module 830 may be connected to the housing 810 of the input/output tray 800 through the support frame 816. The WDM module 830 may thus be removed and replaced by another identical WDM module 830'. The WDM module 830' includes a second set of adapters 832', WDM components 834', and a third set of adapters 836'. When a WDM component fails in the WDM module 830, the original WDM module 830 may be detached from the tray 800. The replacement WDM module 830' may then be swapped in and installed on the tray 800 to thus maintain operation of the input/output tray 800.

Figure 11:
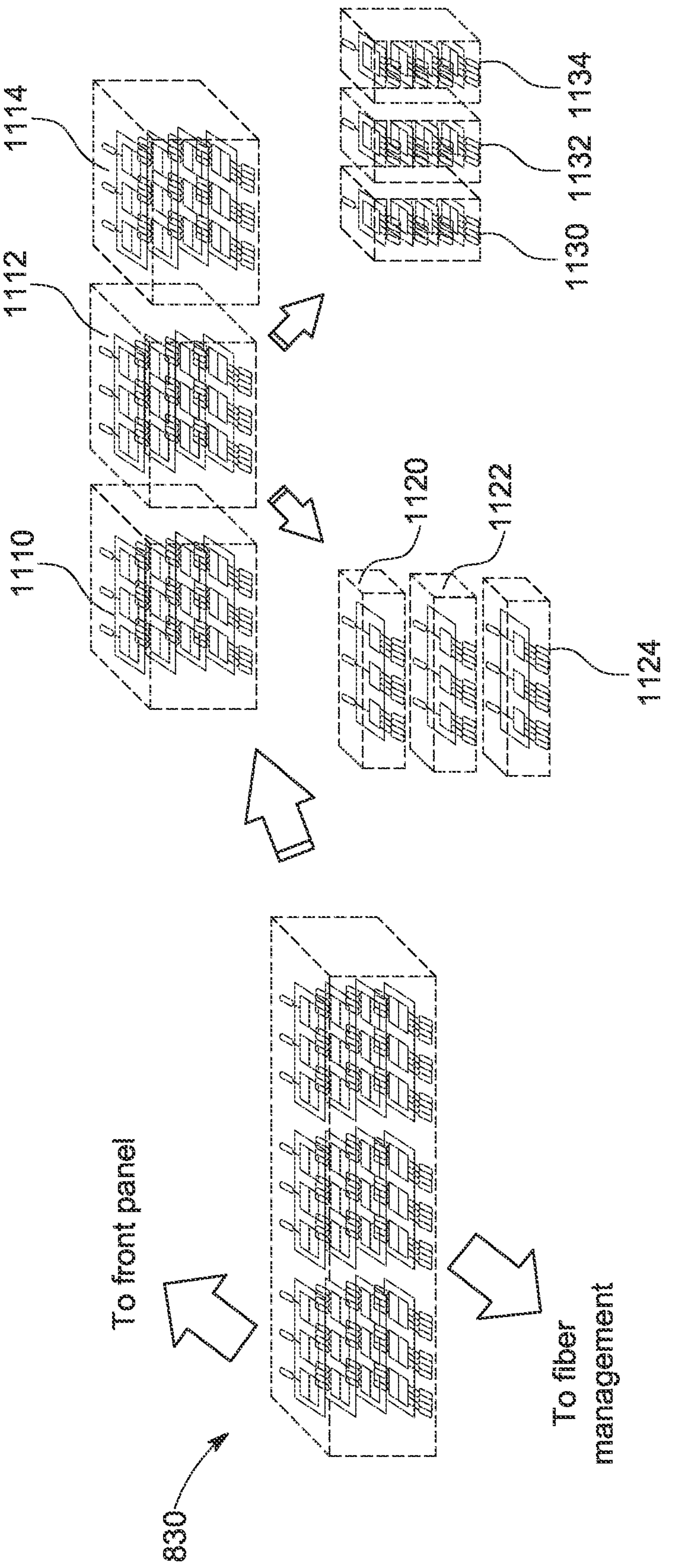
FIG. 11 is different types of sub-modules that may be used as the WDM module in FIG. 8A, according to certain aspects of the present disclosure.

This modularity may be further enhanced by splitting the WDM module 830 into separate sub-modules. FIG. 11 shows different variations of the WDM module 830 that allow for replacement of only a subset of the WDM components 834. In this example, the WDM module 830 may include three sub-modules 1110, 1112, and 1114. Each of the submodules 1110, 1112, and 1114 have rows of circuit boards 840 with the WDM components 834. Thus, the submodules 1110, 1112, and 1114 may be removed and replaced when a WDM component fails, thus allowing the remaining WDM components to continue to operate. Further the submodules such as the submodule 1110 may be further divided in either row modules 1120, 1122, 1124, or column modules 1130, 1132, 1134 to further reduce costs of replacement.

The example optical input/output tray is distinct from ASIC switching circuits in a switch and is an isolated assembly that may be installed in the housing of a CPO based switch. The example optical input/output tray may be installed and removed from the CPO switch assembly to facilitate installation and maintenance.

All optical fibers are managed within the example optical input/output tray. Thus, the interior of the housing of the CPO switch assembly has open spaces, eliminating the need to coil optical fibers around internal electronic elements in a switch or other component. The wind resistance is improved in the switch by eliminating the need to coil numerous optical fibers randomly in a chassis with the use of the optical input/output switch.

Integrating WDM components in the example optical input/output tray solves the difficulty of integrating WDM capabilities in existing CPO modules such as a FR4 CPO module. For server vendors, optical-related elements of the switch may be simplified to the CPO module, the example optical input output tray, and an ELS module. The CPO and ELS modules, and an optical I/O tray, may be exchanged when switching from single wavelength applications to multi-wavelength applications. All the elements in the example optical I/O tray may be exchanged, thus reducing costs and increasing convenience. To prevent the difficulty of integrating WDMs in an CPO module, the WDM components are integrated in the example optical input/output tray. Both fiber management and WDM capabilities are integrated in the example optical input/output tray together. Thus, when the configuration of the CPO-based switch changes from single to multi-wavelength application, the CPO switch assembly requires only exchanging the mechanical components of the example optical input/output tray with WDM components and appropriate ELS modules. In this way, the CPO modules of the switch assembly are compatible with both WDM operation and single wavelength operation. The integration of WDM components in a CPO module is therefore not required, thus saving costs from the requirement of a specialized CPO module.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. An optical input/output tray for insertion in a switch assembly having a front panel and a co-packaged optics module with an optical data signal input and a laser input, wherein the co-packaged optics module is one of a plurality of co-packaged optics modules on a high speed circuit board, the optical input/output tray comprising:

- a housing having a top surface insertable in the switch assembly;
- a first set of adapters connectable to the optical data signal input and laser input of the co-packaged optics module, wherein the first set of adapters are positioned on sides of the top surface;
- a second set of adapters connectable to the front panel;
- a wavelength division multiplexing (WDM) component converting a plurality of multi-wavelength signals from the first set of adapters to a single multiplexed signal, the single multiplexed signal coupled to the second set of adapters, and the WDM component converting a single multiplexed signal from the second set of adapters to a plurality of multi-wavelength signals coupled to the first set of adapters; and
- a fiber management structure positioned in the housing, the fiber management structure communicating optical signals between the first set of adapters, the WDM component, and the second set of adapters, wherein the input/output tray, when inserted in the switch assembly, positions the sides of top surface under the high speed circuit board such that the first set of adapters are in proximity with the plurality of co-packaged optics modules.

2. The input/output tray of claim 1, wherein the WDM component is in proximity to the first set of adapters in the housing.

3. The input/output tray of claim 1, wherein the fiber management structure is contained in the center of the housing relative to the sides of the top surface.

4. The input/output tray of claim 1, further comprising:

- a WDM module attached to the housing at a proximal end to the front panel, the WDM module holding the WDM component coupled to the second set of adapters; and
- a third set of adapters coupled to the WDM component and coupled to the fiber management structure.

5. The input/output tray of claim 4, wherein the WDM module is removable from the housing.

6. The input/output tray of claim 4, wherein the WDM module includes a plurality of removable submodules each of the plurality of removeable submodules including a circuit board mounting a respective WDM component.

7. A switch, comprising:

- a switching controller;
- a co-packaged optical module having an optical data signal input and a laser input, the co-packaged optical module coupled to the switching controller;
- a front panel having couplers for an external laser source and an external optical signaling device; and
- an optical input/output tray having a first set of adapters coupled to the optical data signal input and the laser input of the co-packaged optical module, a second set of adapters coupled to the front panel, and a wavelength division multiplexing (WDM) component converting a plurality of multi-wavelength signals from the first set of adapters to a single multiplexed signal coupled to the second set of adapters and the WDM component converting a single multiplexed signal from the second set of adapters to a plurality of multi-wavelength signals coupled to the first set of adapters.

8. The switch of claim 7, further comprising:

- a motherboard;
- a high speed circuit board mounted on the motherboard, the high speed circuit board supporting the switching controller and the co-packaged optical module, wherein the optical input/output tray includes a housing insertable under the motherboard.

9. The switch of claim 8, wherein the WDM component is in proximity to the first set of adapters in the housing.

10. The switch of claim 8, wherein the housing has a top surface, wherein the first set of adapters are positioned on sides of the top surface.

11. The switch of claim 10, wherein the fiber management structure is contained in the center of the housing relative to the sides of the top surface.

12. The switch of claim 7, wherein the co-packaged optics module is one of a plurality of co-packaged optics modules on the high speed circuit board, and wherein the input/output tray, when inserted in the optical switch assembly, positions the sides of top surface under the high speed circuit board such that the first set of adapters are in proximity with the plurality of co-packaged optics modules.

13. The switch of claim 7, wherein the input/output tray includes:

a WDM module attached to the housing at a proximal end to the front panel, the WDM module holding the WDM component coupled to the second set of adapters; and a third set of adapters coupled to the WDM component and coupled to the fiber management structure.

14. The switch of claim 13, wherein the WDM module is removable from the housing.

15. The switch of claim 13, wherein the WDM module includes a plurality of removable submodules each including a circuit board mounting a WDM component.

16. The switch of claim 7, wherein the switch controller is an application specific integrated circuit (ASIC).

17. An optical input/output tray for insertion in a switch assembly having a front panel and a co-packaged optics module with an optical data signal input and a laser input, the optical input/output tray comprising:

a housing insertable in the switch assembly;

a first set of adapters connectable to the optical data signal input and laser input of the co-packaged optics module;

a second set of adapters connectable to the front panel;

a wavelength division multiplexing (WDM) component converting a plurality of multi-wavelength signals from the first set of adapters to a single multiplexed signal, the single multiplexed signal coupled to the second set of adapters, and the WDM component converting a single multiplexed signal from the second set of adapters to a plurality of multi-wavelength signals coupled to the first set of adapters;

a fiber management structure positioned in the housing, the fiber management structure communicating optical signals between the first set of adapters, the WDM component, and the second set of adapters;

a WDM module attached to the housing at a proximal end to the front panel, the WDM module holding the WDM component coupled to the second set of adapters; and a third set of adapters coupled to the WDM component and coupled to the fiber management structure.

18. The input/output tray of claim 17, wherein the WDM component is in proximity to the first set of adapters in the housing.

19. The input/output tray of claim 17, wherein the housing has a top surface, wherein the first set of adapters are positioned on sides of the top surface and wherein the fiber management structure is contained in the center of the housing relative to the sides of the top surface.

20. The input/output tray of claim 19, wherein the co-packaged optics module is one of a plurality of co-packaged optics modules on a high speed circuit board, and wherein the input/output tray, when inserted in the switch assembly, positions the sides of top surface under the high speed circuit board such that the first set of adapters are in proximity with the plurality of co-packaged optics modules.

* * * * *